United States Patent
Li et al.

(10) Patent No.: US 11,711,669 B2
(45) Date of Patent: Jul. 25, 2023

(54) NEURAL NETWORK LOCALIZATION SYSTEM AND METHOD

(71) Applicant: Kabushiki Kaisha Toshiba, Minato-ku (JP)

(72) Inventors: Peizheng Li, Bristol (GB); Aftab Khan, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 185 days.

(21) Appl. No.: 16/921,429

(22) Filed: Jul. 6, 2020

(65) Prior Publication Data

US 2022/0007139 A1    Jan. 6, 2022

(51) Int. Cl.
*H04W 4/02*   (2018.01)
*G06N 5/04*   (2023.01)
*G06N 3/08*   (2023.01)
*G06N 3/045*  (2023.01)

(52) U.S. Cl.
CPC ............ *H04W 4/027* (2013.01); *G06N 3/045* (2023.01); *G06N 3/08* (2013.01); *G06N 5/04* (2013.01)

(58) Field of Classification Search
CPC ............................................ G06T 2207/20081
USPC .............. 434/257, 6.12; 713/189; 455/456.1, 455/456.5
See application file for complete search history.

(56) References Cited

U.S. PATENT DOCUMENTS

| | | | |
|---|---|---|---|
| 9,730,029 B2 | 8/2017 | Choudhury et al. | |
| 2018/0032908 A1 | 2/2018 | Nagaraju et al. | |
| 2019/0065951 A1* | 2/2019 | Luo ........................ | H04W 4/023 |
| 2019/0205668 A1* | 7/2019 | Noda ........................ | G06T 7/44 |
| 2019/0370647 A1* | 12/2019 | Doshi ........................ | G06N 3/08 |
| 2020/0027009 A1 | 1/2020 | Khan et al. | |
| 2020/0072969 A1* | 3/2020 | Zaidi ........................ | G08G 1/056 |
| 2020/0333453 A1* | 10/2020 | Mende ........................ | G01S 13/91 |
| 2020/0383080 A1* | 12/2020 | Sharma ........................ | H04W 12/037 |
| 2021/0034967 A1* | 2/2021 | Soucy ........................ | G06N 3/08 |
| 2021/0197720 A1* | 7/2021 | Houston ........................ | B60Q 9/008 |

OTHER PUBLICATIONS

Xiang Li, et al., "IndoTrack: Device-Free Indoor Human Tracking with Commodity Wi-Fi", Proceedings of the ACM on Interactive, Mobile, Wearable and Ubiquitous Technologies, vol. 1, No. 3, Sep. 2017, 22 pages.

(Continued)

*Primary Examiner* — Kiet M Doan
(74) *Attorney, Agent, or Firm* — Oblon, McClelland, Maier & Neustadt, L.L.P.

(57) ABSTRACT

A neural network system for inferring a location of a target from a plurality of localization parameters derived from a wireless signal and a method of training thereof. The neural network system comprises first and second neural networks. The plurality of localization parameters comprise one or more parameters relating to a velocity of a target and one or more other parameters. The first neural network is trained to infer a set of candidate locations of a target from values of the one or more other parameters. The second neural network is trained to infer a location of the target from values of the one or more parameters relating to a velocity of the target and a set of candidate locations of the target.

20 Claims, 5 Drawing Sheets

(56) References Cited

OTHER PUBLICATIONS

Xuyu Wang, et al., "Deep Convolutional Neural Networks for Indoor Localization with CSI Images", IEEE Transactions on Network Science and Engineering, vol. 7, No. 1, 2020, 12 pages.

Aftab Khan, et al., "Standing on the Shoulders of Giants: AI-Driven Calibration of Localisation Technologies", arXiv:1905.13118v1 [cs.NI], May 30, 2019, 6 pages.

* cited by examiner

NEURAL NETWORK LOCALIZATION SYSTEM AND METHOD

FIELD

Embodiments described herein relate to methods and systems for localizing targets with wireless signals using machine learning to training such systems.

BACKGROUND

Indoor wireless localization systems are systems for determining or estimating the location of one or more targets, such as people, objects, or electronic devices in indoor locations, where outdoor localization systems such as the satellite based global position system (GPS), may be imprecise or unusable. Such systems are utilized in smart homes, geo-fencing, and health care situations.

Such systems operate by receiving wireless signals from targets with access points or base stations, and measuring one or parameters thereof, such as a received signal strength indicator (RSSI), time of arrival (TOA), time difference of arrival (TDOA), or angle of arrival (AOA). Such signals may be emitted by actively transmitting targets such as electronic tags, mobile phones, or wearable devices, or may be reflected from targets such as people or other objects.

Such indoor wireless localization systems frequently use radio technologies such as Wi-Fi®, Bluetooth®, or ultra-wideband, which are widely available and operate according to unified standards. However, the complexities of wireless signal propagation in indoor environment, such as interference from multipath effects, increase the difficulty of accurately locating a target using such systems.

Arrangements of the embodiments will be understood and appreciated fully from the following detailed description, made by way of example only and taken in conjunction with the drawings in which.

DETAILED DESCRIPTION

Figure 1:
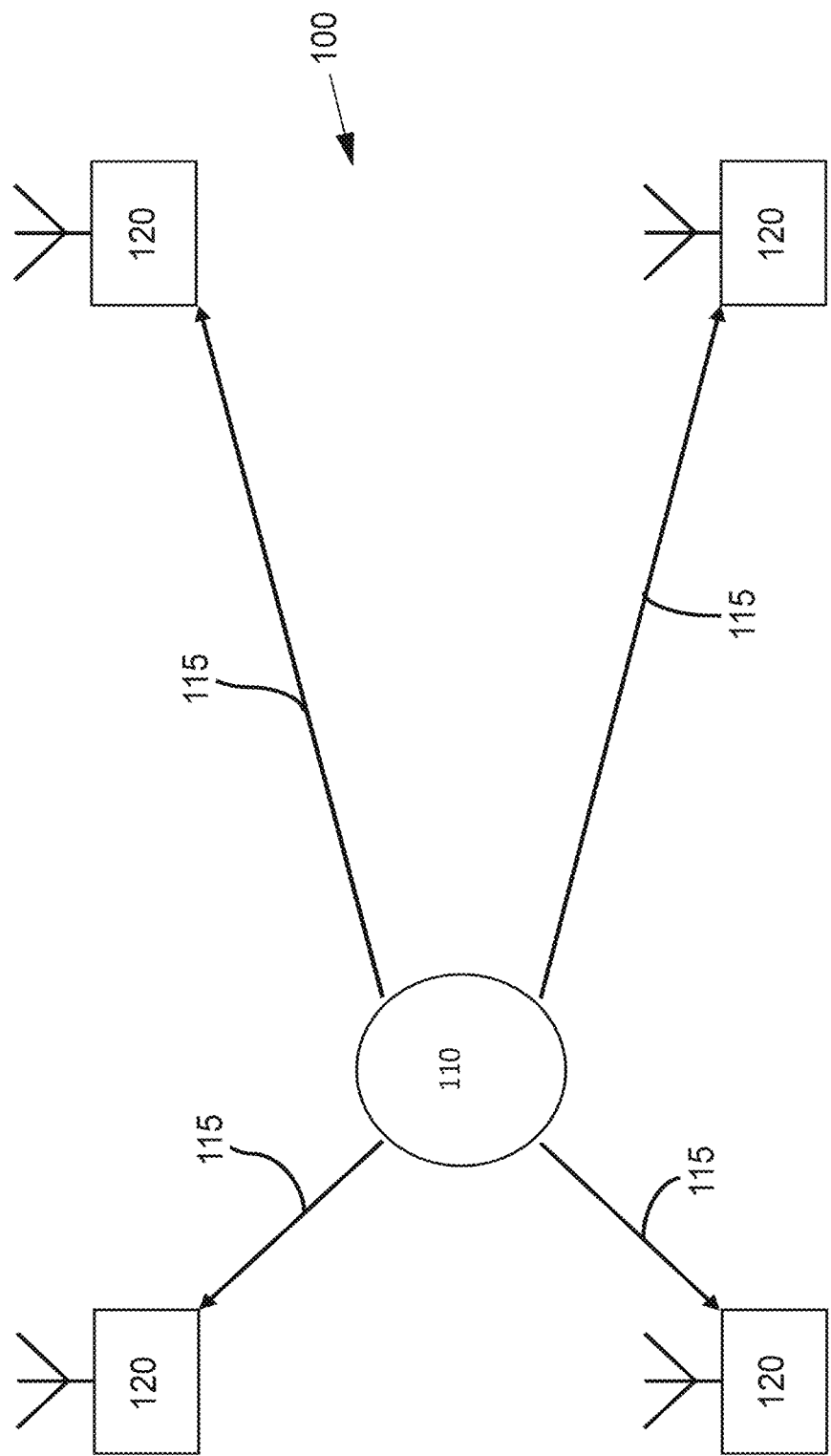
FIG. 1 is a diagram of an indoor localisation system interacting with a target to be located.

According to an embodiment there is provided a method of training a neural network system to infer a location of a target from values of a plurality of localization parameters derived from a wireless signal from the target, wherein the neural network system comprising a first neural network and a second neural network, the plurality of localization parameters comprise one or more parameters relating to a velocity of a target and one or more other parameters, and the method comprises: training the first neural network to infer a set of candidate locations of a target from values of the one or more other parameters; and training the second neural network to infer a location of the target from values of the one or rt ore parameters relating to a velocity of the target and a set of candidate locations of the target.

The first neural network may be trained using a plurality of first training examples each comprising experimentally determined values of the one or more other parameters derived from a signal emitted by the target at an experimentally measured location, and a set of candidate locations derived from the experimentally measured location as an output.

The set of candidate locations of each first training example may be derived from the experimentally measured location by adding artificial noise to the experimentally measured location.

The second neural network may be trained using a plurality of second training examples comprising experimentally determined values of the one or more parameters relating to a velocity of a target derived from signal emitted by the target at an experimentally measured location and a set of candidate locations of the target.

The set of candidate locations of a target comprised by each second training example may be an output of the trained first neural network inferred from experimentally determined values of the one or more other parameters derived from the signal emitted by the target at the experimentally measured location.

The one or more parameters relating to a velocity of a target derived from a wireless signal from the target may be parameters relating to a Doppler velocity derived from a series of consecutive wireless signals including the wireless signal.

The one or more parameters relating to a Doppler velocity may be derived using a short term Fourier transform of a segment of a combined time-domain signal composed of amplitudes of the series of consecutive wireless signals.

The one or more parameters relating to a velocity of a target may comprise one or more Doppler frequency shifts of the signal, one or more Doppler velocity components or Doppler velocities from such Doppler frequency shifts, and/or one or more rates of change of such Doppler frequency shifts, Doppler velocity components or Doppler velocities.

The one or more other localization parameters may comprise parameters of the channel impulse response of the signal to one or more receivers, one or more parameters of the angle of arrival of the signal at one or more receivers, one or more parameters of channel state information of the signal at one or more receivers, one or more parameters of the time of arrival of the signal at one or more receivers, one or more parameters of the power of the signal at one or more receivers, preamble symbol accumulations of the signal at one or more receivers, amplitudes of one or more subcarriers of the signal at one or more receivers, and/or phases of one or more subcarriers of the signal at one or more receivers.

The plurality of localization parameters derived from a wireless signal from a target may be derived from the signal as received by each of a set of receivers.

The signal may be a Wi-Fi® radio signal, Bluetooth® radio signal or ultra-wideband radio signal.

The first and/or the second neural network may each comprise a single hidden layer.

According to an embodiment there is provided a neural network system comprising two neural networks, the neural network system being trained to infer a location of a target from values of a plurality of parameters of a wireless signal from the target using a method as described above.

According to an embodiment there is provided a neural network system configured to infer a location of a target from values of a plurality of localization parameters derived from a wireless signal from the target, wherein the neural network system comprises a first neural network and a second neural network, the plurality of localization parameters comprise one or more parameters relating to a velocity of a target and one or more other parameters, and the first neural network is configured to infer a set of candidate locations of a target from values of the one or more other parameters; and the second neural network is configured to infer a location of the target from values of the one or more parameters relating to a velocity of the target and a set of candidate locations of the target.

According to an embodiment, there is provided one or more non-transitory storage media comprising computer instruction executable by one or more processors, the computer instructions when executed by the one or more processors causing the processors to perform a method as described above.

According to an embodiment One or more non-transitory storage media comprising computer instruction executable by one or more processors, the computer instructions when executed by the one or more processors causing the processors to implement a neural network system as described above.

FIG. 1 is a diagram of an indoor localisation system 100 interacting with a moving target 110 to be located. The illustrated system comprises four receivers 120 configured to receive wireless radio frequency signals 115 from the target 110. The receivers 120 may be wireless access points, base stations and/or software defined radios. The receivers 120 may be configured to receive wireless signals 115 conforming to one or more wireless radio-frequency technology standards, such as Wi-Fi®, Bluetooth®, Bluetooth® low energy (BLE), ultra-wideband (UWB) and/or other standards.

The illustrated embodiment comprises four receivers 120, all of which are shown receiving a signal 115 from the target 110. It will be appreciated that the system 100 may comprise any number of two or more receivers 120 and that individual receivers 120 may or may not receive any given wireless signal 115 from the target. However, a larger number of receivers 120 receiving the wireless signal 115 may advantageously allow a more accurate determination of the location of the target 110 to be performed.

The receivers 120 may be configured to receive signals transmitted by a target to be located, such as an electronic tag, mobile phone, or wearable device. Alternatively, or additionally, the receivers may be configured to receive signals transmitted by one or more non-target transmitters and reflected from the target, which may be an object or person. Such one or more non-target transmitters may be comprised by the system 100. In some such embodiments, the one or more non-target transmitters may be defined by one, some, or all of the receivers, which may be transceivers.

The system 100 is further configured to determine one or more localization parameters of a signal 115 at each of a set of receivers by which that signal is received. Localization parameters of a signal being parameters of the signal, or variables derived therefrom, from which the location of the target may be estimated.

The one or more measured localization parameters of a signal at a receiver may comprise one or more parameters of the channel impulse response (CIR) (such as the CIR power delay profile (PDP) and/or the rms delay spread); one or more parameters of the angle of arrival (AOA) (such as angles of arrival and/or spreads thereof in specific angular coordinates); one or more parameters of channel state information (CSI) (such as the amplitude and/or phase of one or more specific subcarriers); one or more parameters of the power of the received signal (such as a received signal strength indicator (RSSI) and/or a received signal strength in decibels); one or more parameters of the time at which the signal was received (such as the time of arrival (TOA) of the signal at that receiver and/or the time difference of arrival (TDOA) between the receipt of the signal at that receiver and at another of the set of receivers); one or more parameters of the Doppler velocity of the target (such as a Doppler frequency shift, a Doppler velocity component along an axis extending between the receiver and the target calculated therefrom, and/or a rate of change of Doppler velocity); preamble symbol accumulation (PSA) (the number of preamble symbols read into the accumulator of the receiver radio); distance estimates to the target from the receiver; one or more subcarrier amplitudes; and/or one or more subcarrier phases. In some embodiments, the localization parameters may include information contained within a signal transmitted by the target, such as outputs of an accelerometer comprised by the target.

The localization parameters may be directly measured from the signal, or may be calculated or derived from other measured localization parameters. For example, a Doppler velocity may be calculated from a Doppler frequency shift and/or distance estimates from the target to a receiver may be calculated from times of arrival of a signal at the receivers and one or more localization parameters may be derived or extracted from channels state information. For example, parameters of the angle of arrival of a signal at receiver may be estimated and/or extracted from the channel state information of the signal at that receiver, such as by using an algorithm such as a two-dimensional multiple signal classification (2D-MUSIC) algorithm. Alternatively, or additionally amplitude and/or phase information of subcarriers may be extracted from channel state information using principle component analysis (PCA). Channel state information may be available at receivers defined by WiFi® access points with specially configured network interface controllers (NICs).

In some embodiments, the determined localization parameters may depend upon the radio technology with which the signal is transmitted. For example, if a signal is an ultra-wideband signal, the determined localization parameters may be channel impulse response (CIR) power indicators and preamble symbol accumulations (PSAs), whereas if a signal is a Bluetooth® low energy (BLE) signal, the derived localization parameters may be received signal strength indicators (RSSIs) and parameters of the angle of arrival (AOA) of the signal at the receivers.

The determined localization parameters of a signal at the receivers by which the signal was received are then used to determine or estimate a position, or locus of possible positions, of the target 110. Such determinations are performed using one or more mappings of the received wireless signal 115 and localization parameters thereof to a target locations, or locus of locations. Such one or more mappings may advantageously compensate for signal interference caused by the system operating in a multipath environment.

In some embodiments, indoor localization systems 100 may be configured to use a plurality of different such mappings for determining positions or loci of positions from localization parameters of a signal as received by different sets of receivers. For example, an indoor localization system 100 comprising four receivers may be configured to use a first mapping if a signal 115 from a target 110 is received by all four receivers 120 and to use one of a set of second to fifth mappings if a signal 115 is received by only three of the four receivers 120. The second to fifth mappings corresponding to the four possible sets of three of the four receivers 120 which may have received the signal. The selection of which of plurality of mappings to use may be made by a pre-processing module or means comprised by the indoor localization system. Such a pre-processing module or means may examine or determine which receivers have effectively received a signal and may select a mapping corresponding to these receivers.

Such mappings are implemented using neural networks and are obtained by training such neural networks using experimentally obtained sets of localisation parameters and associated target locations as training data. Neural networks may advantageously provide flexible configurations and allow the location of a target to be determined with a high degree of accuracy.

Figure 2:
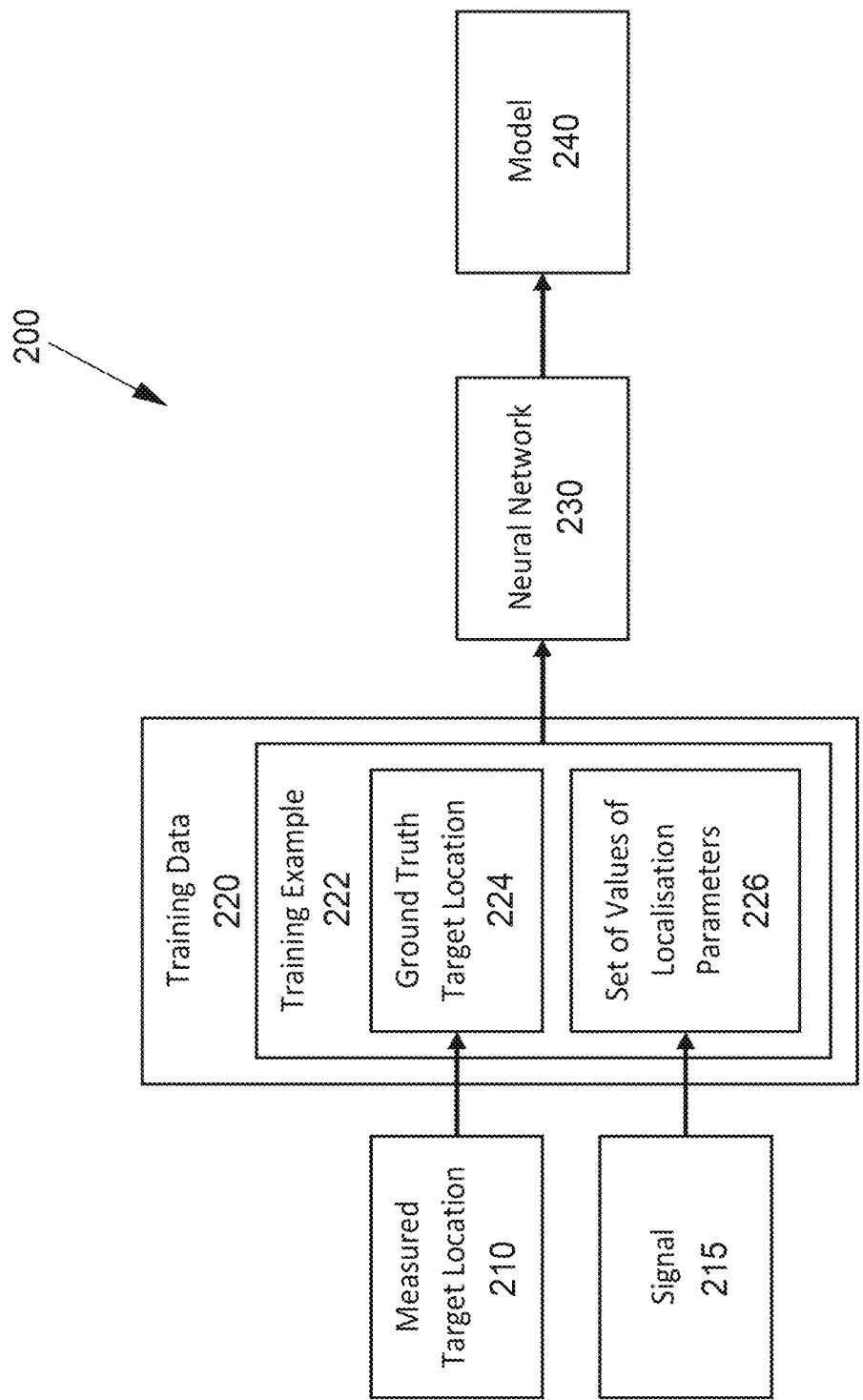
FIG. 2 is a diagram of a conventional method of training a neural network to determine the location of a target from parameters of a radio technology signal from the target measured at a set of receivers.

FIG. 2 is a diagram of a conventional method 200 for training a neural network 230 to determine the location of a target from localisation parameters of a radio technology signal from the target at each of a set of receivers.

The method utilises training data 220 consisting of a plurality of training examples 222 each consisting of a set of localisation parameter values 226 as inputs and a corresponding ground truth target location 224 as a desired output. The ground truth target locations 224 are each a measured location 210 of a target (for example, in the form of x and y coordinates within an area monitored by the receivers). The corresponding set of localisation parameter values 226 are values of a plurality of selected localisation parameters of a signal 215 emitted by the target at that location 210, as received by each of a set of receivers (for example, a received signal strength indicator and parameters of an angle of arrival at each of the set of receivers). Each set of localisation parameter values 226 consists of the same localisation parameters for a different signal 215 emitted by a target at a location 210.

A single training example 222 of the training data 220 is shown in FIG. 2 along with the experimentally measured signal 215 and target location 210 from which it is derived. It will be appreciated that the training data 220 comprises a plurality of such training examples 222, each derived from different pairs of target locations 210 and associated measured signals 215.

The neural network 230 is trained using conventional techniques, using the localisation parameter values 226 of training examples 222 as inputs, comparing the outputs of the neural network 230 to the corresponding ground truth target locations 224, and adjusting the parameters of the neural network 230 accordingly. After training is complete, the neural network 230 is deployed as a model 240 to a system 100 as described above to allow the location of targets 110 to be determined via inference.

Such a method may be used to train a neural network 230 to infer a location of a target from localization parameters such as the parameters of the angle of arrival of a signal 215 emitted by the target at receivers, and/or parameters of the Doppler velocity of such a target when it emits such a signal 215. However, such angle of arrival measurements are limited by the number of antennas of the receivers receiving the signal 215, which introduces a random error into these measurements. Doppler frequency shift measurements may be obtained from the short-term Fourier Transformation (STFT) of segments of combined consecutive time domain signals from the target. A single Doppler shift measurement is obtainable from each short term Fourier transformed segment of such a combined time domain signal, with each segment being formed from a large number of measurements or samples of a received signal from target (typically between 50 and 100 such measurements or samples). Therefore, a single Doppler shift measurement corresponds to a large number of different individual measured signals during a time window, and therefore may not accurately represent the instantaneous Doppler velocity of the target at the time that any given measured signal is emitted. Additionally, such a method trains a neural network to infer a specific coordinate location of a target from these localisation parameters, which is highly susceptible to instability in the input localisation parameters, especially in shallow neural networks, which while being training friendly, have limited predictive power when performing regression analysis.

Figure 3:
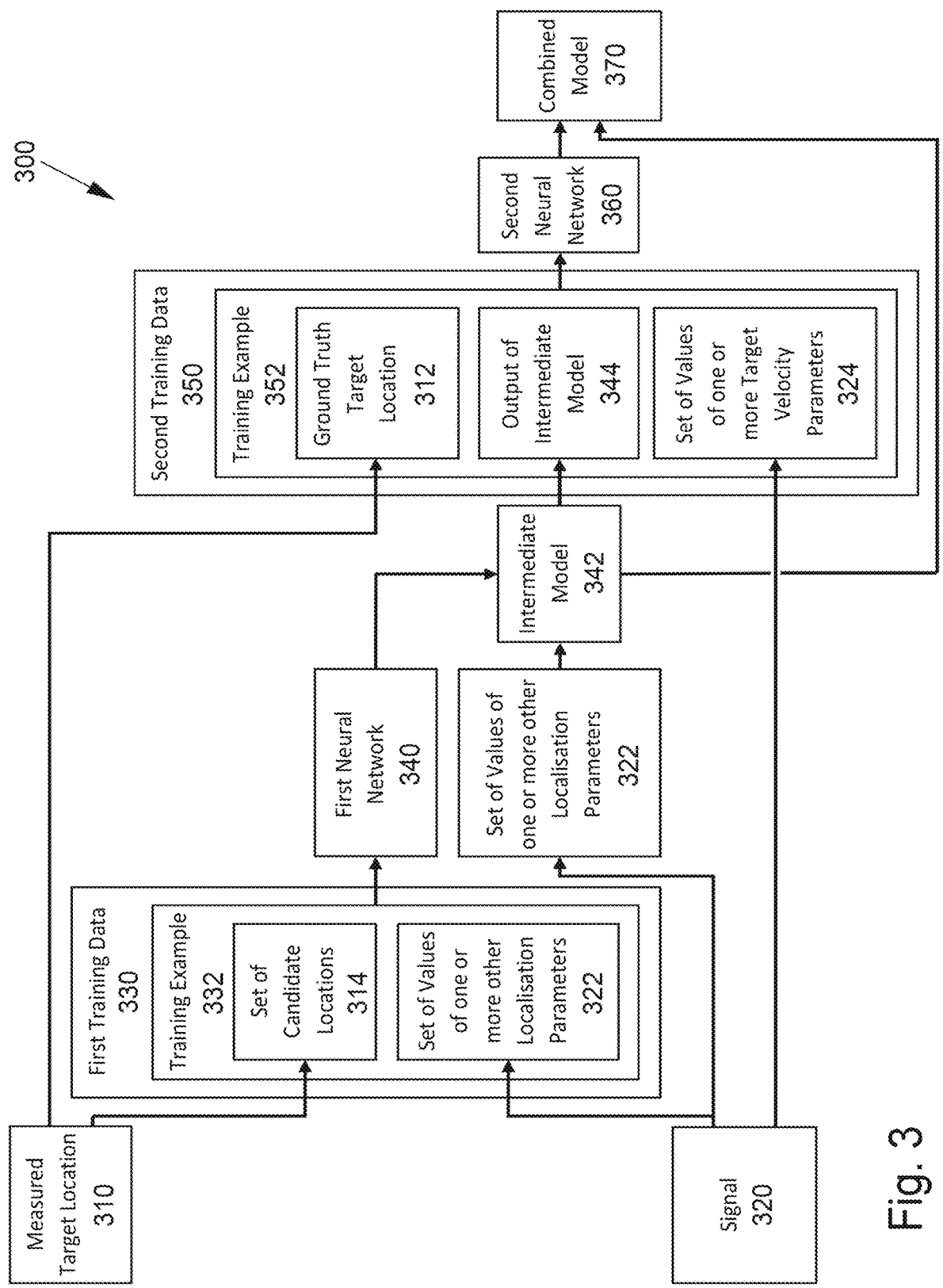
FIG. 3 is a diagram of an embodiment of a method for training a neural network system to determine the location of a target from parameters of a radio technology signal from the target measured at a set of receivers.

FIG. 3 is a diagram of an embodiment of a method 300 for training a neural network system to determine the location of a target from selected localisation parameters of a radio technology signal received from the target by a set of receivers. The neural network system comprises first and second neural networks 340, 360 and training the neural network system comprises training the first neural network 340 and subsequently training the second neural network 360.

The selected localisation parameters comprise one or more parameters relating to the velocity of the target and one or more other selected localisation parameters. The localisation parameters are obtained from measurements of the radio technology signal as received by each of the set of receivers.

The one or more parameters relating to the velocity of the target are preferably parameters of and/or parameters indicative of the velocity of the target. In preferred embodiments, the one or more parameters relating to the velocity of the target are parameters of the Doppler velocity of the target, such as Doppler frequency shifts of the signal, Doppler velocity components or Doppler velocities calculated therefrom, and/or rates of change of such calculated Doppler velocities, components or frequency shifts. In alternative embodiments, the parameters relating to the velocity of the target may be other parameters, such as parameters transmitted in the signal from an accelerometer comprised by the target.

The one or more other localisation parameters are preferably parameters indicative of the location of the target at the time the signal was transmitted, such as parameters of the angle of arrival of the signal, parameters of the power of the received signal, parameters of the time of arrival of the signal, or parameters of channel state information.

Each of the localisation parameters may be derived from a radio-frequency signal as received by one of the set of receivers, or may derived from the signal as received by multiple different receivers. For example, localisation parameters of the intensity or of the angle of arrival of the signal at a single given receiver may be derived from a measurement of the signal at that single receiver, whereas localisation parameters such as the time difference between the arrival of the signal at two different receivers may be derived from measurements at multiple receivers.

The first neural network 340 is trained to determine a set of candidate locations of a target from values of the one or more other localisation parameters of a radio technology signal from that target. Training the first neural network utilises training data 330 consisting of a plurality of training examples 332 each consisting of a set of values 322 of the one or more other localisation parameters and a corresponding set of candidate locations 314. The sets of values 322 of the one or more other localisation parameters being the inputs of the training examples and the corresponding sets of locations being the desired outputs of those training examples.

Each set of candidate locations may be a plurality or matrix of candidate locations, and/or may be an area of candidate locations, such as an area defined by a bounding box.

The localisation parameter values 322 and corresponding sets candidate locations 314 are derived from experimental measurements taken using the system with which the neural network system is to be deployed. Each set of candidate locations 314 is obtained by adding artificial noise to an experimentally measured location 310 of a target. The corresponding set of values 322 of the one or more other localisation parameters are values of these parameters derived from a signal 320 emitted by the target at that location 310 and received by the set of receivers. The experimentally measured target may be moving when it is measured, and the localisation parameters may include parameters indicative of the target's movement.

The first neural network 340 is trained by comparing the sets of candidate locations 314 of the training examples to the outputs of the first neural network 340 when using the sets of localisation parameter values 322 of those training examples 332 as inputs, and adjusting the parameters of the first neural network 340 accordingly. After training is complete, the first neural network 340 forms an intermediate model 342 that is configured to determine a set of candidate locations of a target from values of the one or more other localisation parameters of a signal from the target at each of the set of receivers.

The second neural network 360 is trained to determine an estimated location of a target from values of a parameter of the velocity of the target and a set of candidate locations of the target, as output by the first neural network.

Training the second neural network 360 utilises training data 350 consisting of a plurality of training examples 352. Each of these training examples 352 consists of a ground truth target location 312, one or more corresponding parameters 324 relating to the velocity of the target, and a set of candidate target locations 344 derived by the intermediate model 342 from a corresponding set of values 322 of the one or more other localisation parameters. The ground truth target locations 312 define the desired outputs of the training examples 352, and the corresponding parameters 324 relating to the velocity of the target and sets of candidate locations 344 together define the inputs of those training examples 352.

In some embodiments, each of the training examples 352 may further comprise the sets of values 322 of the one or more other localisation parameters, or other localisation parameters, which may define inputs of the training examples 352 along with the parameters 324 relating to the velocity of the target and the sets of candidate locations 344. Alternatively, or additionally, the training examples 352 for the second neural network may comprise additional localisation parameters that also define inputs thereof.

The training examples 352 are derived from experimental measurements taken using the system with which the neural network system is to be deployed. These experimental measurements may be the same as or different to the measurements from which the training examples 332 used to train the first neural network 340 were derived. FIG. 3 shows a configuration in which training examples 332, 352 for both the first and second neural networks 340, 360 from the same measured target locations 310 and measurements of signals 315 emitted by targets in those locations 310.

The ground truth target locations 312 are each a measured location 310 of a target, and the corresponding set of one or more parameters relating to the velocity of the target 324 are derived from a signal 320 emitted by the target at that location 310 as received by the set of receivers. In some embodiments, the one or more parameters relating to the velocity of the target 324 may be derived from a plurality of consecutive signals comprising the signal 320; for example, in embodiments therein the velocity parameters are Doppler velocity parameters derived using a Fourier transform. The set of candidate locations 344 is inferred by the intermediate model 342 from an input consisting of the set of values 322 of the one or more other selected localization parameters of that signal 320 as received by the receivers. In some embodiments, these sets of localization parameter values 322 are the same as the sets of values used to train the first neural network 340 as described above, in which case the ground truth target locations 312 are the measured locations 310 from which the sets of candidate locations 314 used to train the first neural network were derived.

A target at any given location 310 may be moving in different directions and therefore different training examples could comprise identical or similar measured locations 310 but significantly different Doppler velocities 324.

The second neural network 360 is trained by comparing the ground truth target locations 312 of the training examples 332 to the outputs of the second neural network 360 when using the sets of candidate locations 344 inferred from localisation parameter values 322 by the intermediate model 342 and corresponding parameters 324 relating to the velocity of the target as inputs. The parameters of the first neural network 340 are adjusted accordingly.

The trained second neural network is configured to infer a location of a target from values of a change in Doppler velocity and a set of candidate locations of that target, as output by the trained first neural network from values of the one or more other localisation parameters. The trained second network may be configured to determine a location of the set of candidate locations at which the target is most likely to be located.

FIG. 3 shows single training examples 332, 352 of the first training data 330 and the second training data 350, each derived from the same experimentally measured signal 320 and target location 310. It will be appreciated that both the first and second training data 330, 350 comprise a plurality of such training examples 332, 352 derived from different pairs of target locations 310 and associated measured signals 320.

After its training is complete, the second neural network 340 is combined with the intermediate model 342 of the trained first neural network 340 to form a combined model 370. The combined model is configured to estimate a location of a target from values of the Doppler velocity and of the one or more other selected localization parameters at the receivers.

A two neural network model as described above with reference to FIG. 3 is able to locate a target more accurately from parameters relating to the velocity of the target 325 (such as parameters of a Doppler Velocity of the target) and the other selected localisation parameters 322 than a single neural network trained to use these inputs conventionally using the method described above with reference to FIG. 2. Training the first neural network 340 to infer a set of candidate locations requires less complex regression analysis and uses less training resources than training a neural network to infer a specific location from location parameters, such as in the method described with reference to FIG. 2. The second neural network may then be able to refine this result and to infer a relatively precise target location from the set of candidate locations and the parameters of Doppler velocity.

The first and/or second neural networks 340, 360 may be shallow neural networks, which may each comprise a single hidden layer. Alternatively, one or both of the first and second neural networks 340, 360 may comprise a plurality of hidden layers. The first and/or second neural networks 340, 360 preferably comprise a single input layer and a single output layer. Alternatively, the first neural network 340 and/or the second neural network 360 may comprise a plurality of input layers and/or a plurality of output layers.

In some embodiments, combining the two neural networks may comprise configuring the values of the output of the first trained neural network 340 to be provided as inputs to some of the input neurons of the second neural network 360. Such an output is preferably provided along with one or more parameters relating to the velocity of the target corresponding to the inputs from which the first trained neural network inferred that output.

Alternatively, or additionally, combining the neural networks may comprise combining, merging or concatenating the two neural networks into a single neural network. Combining the neural networks in this manner ay advantageously increase the processing speed of the combined model by allowing all input localization parameters to be processed together instead of separately.

Combining the two neural networks may comprise combining the output layer (or output layers) of the first neural network with an input layer (or with multiple input layers) such that the output neurons of the first neural network define the input neurons of the second neural network that are for receiving a set of candidate locations. The combined output layers of the first neural network and input layers of the second neural network may define one or more partially hidden intermediate layers of the combined single neural network.

For example, a trained first neural network may be combined with a trained second neural network. The first neural network may comprise a first input layer, one or more first hidden layers, and a first output layer comprising X output neurons for outputting a values defining a set of candidate locations. The second neural network may comprise a second input layer, one or more second hidden layers, and a second output layer for output a target location. The second input layer comprising X input neurons for receiving values defining a set of candidate locations and Y input neurons for receiving values or parameters relating to the velocity of a target. Combining the first and second neural networks comprises combining the first output layer with the second input layer to form an intermediate layer comprising the Y input neurons for receiving values or parameters relating to the velocity of a target, and X hidden neurons, which in use will contain values defining sets of candidate locations.

A combined neural network may comprise an input layer, one or more first hidden layers following the input layer, an intermediate partially-hidden layer following the one or more first hidden layers, one or more second hidden layers following the intermediate layer, and an output layer following the one or more second hidden layers. The partially hidden intermediate layer preferably comprises both hidden neurons and non-hidden input neurons. In such a neural network, the first input layer, the one or more first hidden layers and the hidden nodes of the intermediate layer preferably have the same configuration as the input layer, one or more hidden layers and output layer of the first neural network 340 respectively. Similarly, the entire intermediate layer, the one or more second hidden layers and the output layers preferably have the same configuration as the input layer, one or more hidden layers and the output layer of the trained second neural network 360. The hidden neurons of the intermediate layer preferably receive values defining a set of candidate locations 344 from the first hidden layers and provide them to second hidden layers, thereby effectively acting as both output neurons for the first neural network 340 and input neurons for the second neural network 360. The non-hidden input neurons of the intermediate layer are preferably for receiving values of parameters 324 relating to the velocity of the target, and optionally other localization parameters.

Figure 4:
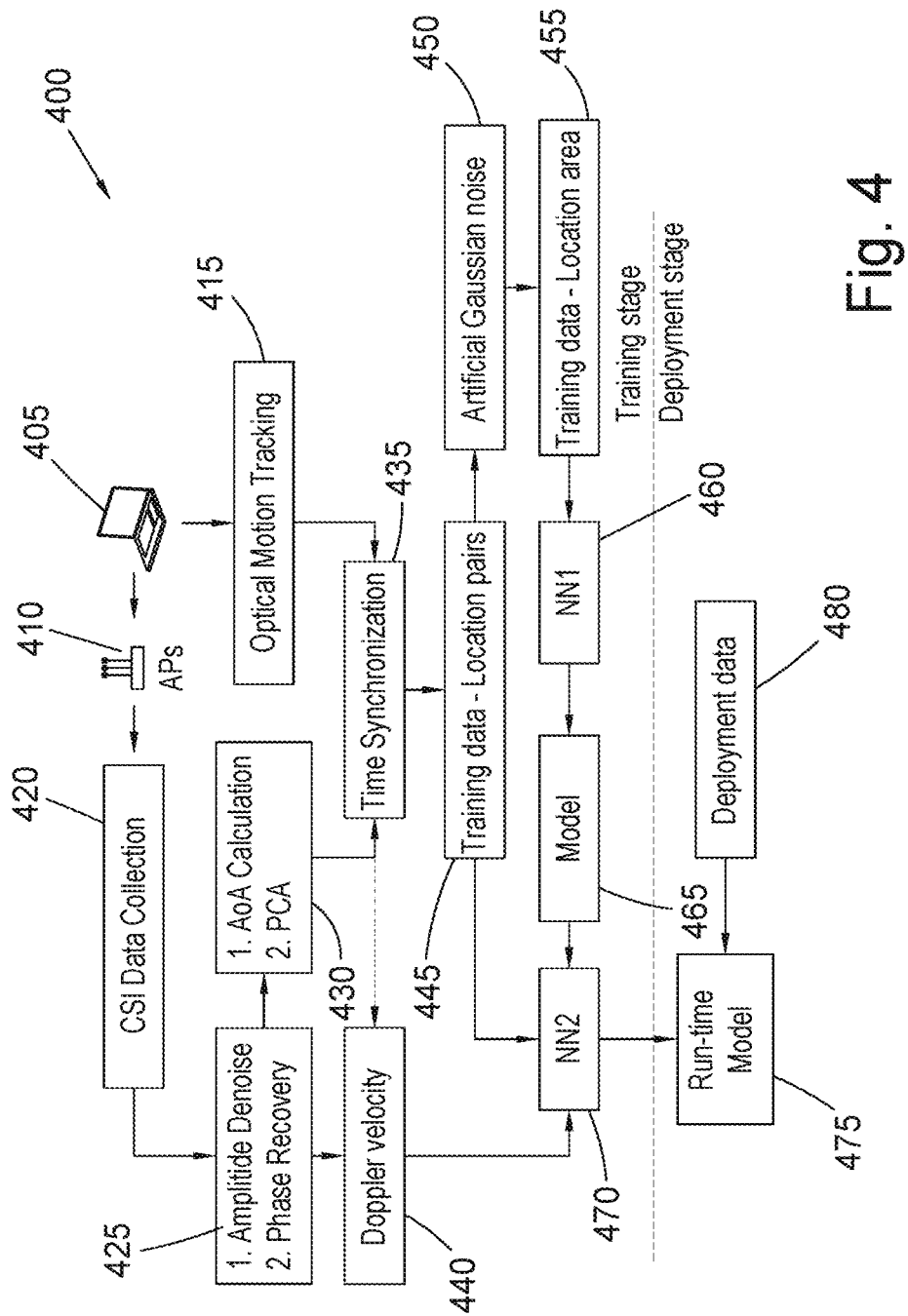
FIG. 4 is a diagram of an embodiment of a method for training a neural network system to determine the location of a target tag from a parameters of a Wi-Fi® signal transmitted by the target tag as received by three Wi-Fi® access points.

FIG. 4 shows an embodiment of a method 400 for training a model comprising two neural networks 460, 470 for locating a target 405 emitting a Wi-Fi® signal using an indoor localization system comprising three Wi-Fi® access points 410 receiving the signal. The method follows the structure described above with reference to FIG. 3, with the selected one or more localisation parameters relating to the velocity of the target being parameters of a change in Doppler velocity 440. The selected one or more other localisation parameters are parameters of the angle of arrival of the signal at each of the three access points, and phases and amplitudes of subcarriers of the signal at each of the three access points.

The phases and amplitudes are extracted from channel state information of the signal as received by each of the three access points using principle component analysis. The parameters of the angle of arrival of the signal at each of the three receivers are calculated from this channel state information using a multiple signal classification (MUSIC) algorithm.

The method comprises initially collecting training data to train the first and second neural networks of the model. This stage comprises arranging a target tag configured to emit Wi-Fi® signals within an area covered by the three Wi-Fi® access points of the indoor localization system, moving the tag within this area while periodically emitting Wi-Fi® signals and tracking 415 the location of the tag using an optical motion tracing system. The periodically emitted Wi-Fi® signals are received at each of the access points and channel state information (CSI) of the signals is collected 420.

The CSI of each signal collected by each access point 410 is processed to extract the localization parameters of that signal at that access point.

The CSI of each signal collected by each access point 410 is initially processed 425 to remove errors and noise due to hardware imperfections. This processing 425 of the CSI comprises removing noise from amplitude information of the CSI, for example using a filter such as a Hampel filter to remove outlier values present due to hardware imperfections. This processing 425 further comprises recovering true phase information from the phase information of the CSI by correcting synchronisation errors between the transmitter of the signal (the target 405) and the receiver (access point 410) at which the CSI was collected regarding their clocks and/or timings. This allows the true phase of subcarriers of the CSI to be recovered. The correction of synchronization errors may be performed using the method proposed in 'You are facing the Mona Lisa: spot localization using PHY layer information' S. Souvik et al, in ACM MobiSys, pages 183-196, 2012.

The CSI is further processed 430 to determine the phases and amplitudes of a plurality of subcarriers of the signal received by each access point 410 and the angle of arrival with which that signal was received by that access point 410. The phases and amplitudes of the subcarriers are determined using Principle Component Analysis (PCA) choosing the top 5 dominated components. The angle of arrival (ACM) of the signal at the access point is determined using a multiple signal classification (MUSIC) algorithm.

A Doppler velocity 440 of the target tag corresponding to each signal is determined. This is performed by obtaining a combined signal in the time domain for each receiver (access point 410) by combining the amplitudes of a series of consecutive signals as received by that receiver. The combined signal for each receiver is transformed into the frequency domain. This is performed by dividing the combined signal into identical series of one or more segments, and performing a short-time Fourier transform (STFT) on each segment to determine a sinusoidal frequency (and a phase) thereof. The number of segments is inversely proportion to the number of consecutive signals comprised by each segment, which may be between 50 and 100 signals. A Doppler frequency shift for each segment of each receiver's combined signal is obtained from the frequency of that segment of that combined signal. A Doppler velocity of the target for each segment is calculated from the Doppler frequency shifts of that segment of each of the three receiver's combined signals. This Doppler velocity corresponds to all the signals within that segment.

The parameters of the angle of arrival (AGA) and the subcarrier amplitudes and phases measured from a signal at each of the three access points 410 are synchronized 435 with those measured at the other two access points 410 from the same signal, with a Doppler velocity 440 corresponding to that signal (the Doppler velocity of the time segment within which that signal was located), and with the ground truth location of the target tag measured by the optical motion tracking system at the time that signal was emitted. These synchronized measurements together define a training data-location pair 445 from which a first training example for training the first neural network 460 and a second training example for training the second neural network 470 are obtained. A plurality of such training data—location pairs 445 are obtained from measurements of the target tag's location and of signals emitted thereby as it is moved around the area covered by the three Wi-Fi® access points 410 of the indoor localization system. This allows a plurality of training examples to train the first and second neural networks to be obtained therefrom.

A set of candidate target locations 455 is obtained from each training data-location pair 445 by adding artificial noise 450 to the ground truth target tag location of that training data-location pair. The artificial noise 450 is added with a selected probability distribution. In the illustrated example, artificial noise is added to both the x and y coordinates of the ground truth target location using a Gaussian noise probability distribution with a mean of zero and a variance of 0.3 meters. A Gaussian noise probability distribution advantageously contains the highest degree of uncertainty, which benefits the training of the first neural network 460; alternatively, other noise distributions, such as Rayleigh noise or gamma noise distributions may be used. The probability distribution preferably has a mean of zero. The variance of the probability distribution may be selected in dependence upon the mean error with which a single neural network (such as the single neural network described above with reference to FIG. 2) is able to locate a target. The variance may be half the mean localisation error of such a single neural network (for example a single neural network comprising the same number of layers as each of the two neural networks 460, 470 of the model). For example, if such a single neural network has a mean localisation error of 0.50 m, the variance may be selected as 0.25 m.

The set of target locations may be a plurality of x,y coordinates. For example, the ground truth may be a single set of x, y coordinates, noise may be added to the x coordinate to transform it into five different x coordinates, and to the y coordinate to transform it into five different y coordinates. The single set of x, y coordinates is thereby transformed into five sets of x, y coordinates which may be presented as a five by two matrix.

The first neural network 460 is then trained using first training examples consisting of the values of angle of arrival (AOA) and subcarrier amplitudes and phases of the plurality of training examples as inputs and the sets of candidate target locations 455 obtained from the ground truth locations of the same training data-location pairs as desired outputs. The trained first neural network 460 produces a model 465 for inferring a set of candidate locations of a target tag from the values of angle of arrival (AOA) and the subcarrier amplitudes and phases of a Wi-Fi® signal emitted by the target tag as received by each of the three access points 410.

After the first neural network 460 is trained the second neural network 470 is trained using second training examples consisting of the values of the Doppler velocity 440 and the output of the trained first neural network 460 when the angle of arrival (AOA) and subcarrier amplitudes and phases of the same training examples as inputs. The second training examples consist of the ground truth target tag locations of the same training data-location pairs 445 as desired outputs. The trained second neural network 470 produces a model for inferring an estimated location of a target tag from a Doppler velocity and a set of candidate locations as output by the model of the trained first neural network.

After the first and second neural networks 460, 470 are trained they are combined to define a run-time model 475 configured to infer the location of a target tag from deployment data 480 consisting of values for Doppler velocity, angle of arrival (AOA), and subcarrier amplitudes and phases of a signal emitted by the tag as received the three Wi-Fi® access points.

The neural networks 460, 470 are shallow neural networks comprising single hidden layers. Such neural networks are advantageously computationally more efficient than other configurations, which may allow the trained models to be deployed on low-energy devices with limited computational capacity. A cross-validation scheme is used to evaluate the accuracy of an output of the neural networks in comparison to the desired output corresponding to the training inputs.

The method described above with reference to FIG. 4 is adaptable to train a system for an indoor localization system comprising Bluetooth® receivers instead of Wi-Fi® access points, with the signals from the target tag being Bluetooth® signals instead of Wi-Fi® signals. In such cases, the one or more selected localisation parameters used in addition to the Doppler velocity may be received signal strength indicators (RSSIs) and angles of arrival (AOA) of the signal at each of the access points instead of the angle of arrival and phases and amplitudes of subcarriers of the signal.

Additionally, the method may be adapted to train a system for an indoor localization system comprising ultra-wideband (UWB) receivers instead of Wi-Fi® access points, with the signals from the target tag being ultra-wideband (UWB) signals instead of Wi-Fi® signals. In such cases, the one or more selected localisation parameters used in addition to the Doppler velocity may be channel impulse response (CIR), preamble symbol accumulation (PSA), and distance estimates derived from time of arrival (TOA) of the signal, instead of the angle of arrival and phases and amplitudes of subcarriers of the signal.

Figure 5:
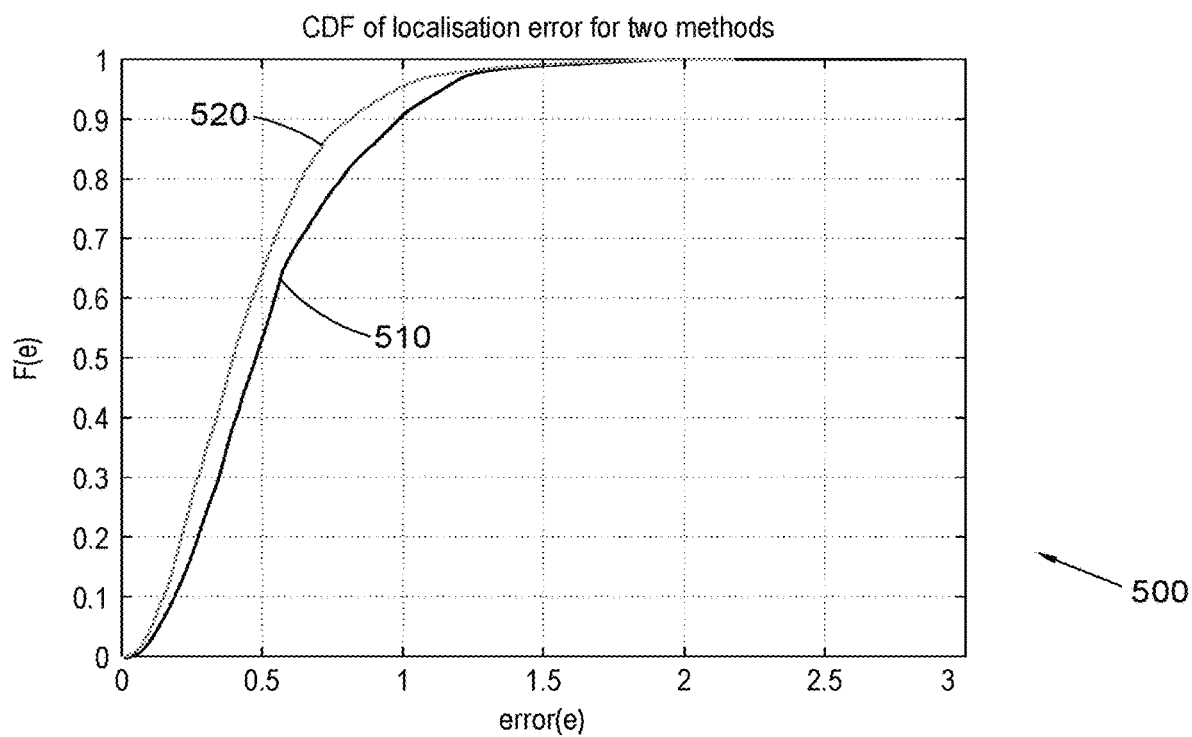
FIG. 5 is a graph comparing localisation errors of an embodiment of a neural network system comprising two neural networks to a single neural network.

FIG. 5 is a graph 500 showing the cumulative distribution functions of the errors in meters between the actual location of a target tag and the location estimated by two machine-learning systems. The first machine learning system was a conventional machine learning system comprising a single neural network using the angle of arrival, Doppler velocity, and the phase and amplitudes of subcarriers of inputs. The second machine learning system was a neural network system comprising two neural networks trained as described above with reference to FIG. 4. As shown in the graph 500, the errors of the second system 520 were up to 25% lower than the errors 510 of the first system. The mean error of the second system was 0.4558 meters and the mean error of the first system was 0.5427 meters.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method comprising:
training a first neural network to infer a set of candidate locations of a target from one or more first parameters relating to at least one characteristic of a wireless signal received by a plurality of receivers, wherein the wireless signal was emitted by the target, the one or more first parameters being indicative of a location of the target at a time the signal was transmitted, the first parameters including localization parameters relating to an intensity or angle of arrival of the wireless signal or relating to a time difference of arrival between wireless signals at two different receivers which are included in the plurality of receivers; and
training a second neural network to infer the location of the target from one or more second parameters relating to a velocity of the target and the inferred set of candidate locations of the target, the one or more second parameters being derived from the emitted wireless signal, the velocity being derived using a frequency transformed from a segment of a combined time-domain signal composed of amplitudes of one or more wireless signals including the received wireless signal, the one or more wireless signals being received by the plurality of receivers.

2. The method according to claim 1, wherein the step of training the first neural network includes training using a plurality of first training examples each including determined values of the one or more first parameters derived from the wireless signal emitted by the target at a predetermined location, and a set of candidate locations derived from the predetermined location as an output.

3. The method according to claim 2, wherein the set of candidate locations of each first training example is derived from the predetermined location by adding noise to the predetermined location.

4. The method according to claim 1, wherein the step of training the second neural network includes training using a plurality of second training examples including determined values of the one or more second parameters relating to the velocity of the target derived from the wireless signal emitted by the target at a predetermined location and the set of candidate locations of the target.

5. The method according to claim 4, wherein the set of candidate locations of the target included in each second training example is an output of the trained first neural network inferred from the one or more first parameters derived from the wireless signal emitted by the target at the predetermined location.

6. The method according to claim 1, wherein the one or more second parameters relating to the velocity of the target derived from the wireless signal emitted by the target are parameters relating to a Doppler velocity derived from one or more wireless signals including the received wireless signal, the one or more wireless signals being emitted within a predetermined period, the one or more wireless signals being received by the plurality of receivers.

7. The method according to claim 6, wherein the one or more parameters relating to the Doppler velocity are derived using a short term Fourier transform of a segment of a combined time-domain signal composed of amplitudes of the one or more wireless signals.

8. The method according to claim 1, wherein the one or more second parameters relating to the velocity of the target include one or more Doppler frequency shifts of the signal, one or more Doppler velocity components or Doppler velocities from the Doppler frequency shifts, or one or more rates of change of at least one of the Doppler frequency shifts, the Doppler velocity components, or the Doppler velocities.

9. The method according to claim 1, wherein the one or more first parameters and the one or more second parameters include at least one of parameters of a channel impulse response of a signal to one or more receivers, one or more parameters of an angle of arrival of the signal at the one or more receivers, one or more parameters of channel state information of the signal at the one or more receivers, one or more parameters of a time of arrival of the signal at the one or more receivers, one or more parameters of a power of the signal at the one or more receivers, preamble symbol accumulations of the signal at the one or more receivers, amplitudes of one or more subcarriers of the signal at one or more receivers, or phases of one or more subcarriers of the signal at the one or more receivers.

10. The method according to claim 1, wherein the one or more first parameters and the one or more second parameters are derived from the wireless signal transmitted from the target, as received by each of the plurality of receivers.

11. The method according to claim 1, wherein the wireless signal is a Wi-Fi (RTM) radio signal, a Bluetooth (RTM) radio signal, or an ultra-wideband radio signal.

12. The method according to claim 1, wherein each of the first and second neural networks includes a single hidden layer.

13. One or more non-transitory storage media comprising computer instructions executable by one or more processors, the computer instructions, when executed by the one or more processors, causing the one or more processors to perform the method according to claim 1.

14. A neural network system, comprising:

a first neural network and a second neural network, wherein the neural network system is configured to infer a location of a target from a plurality of localization parameters derived from a wireless signal from the target, the plurality of localization parameters include one or more second parameters relating to a velocity of the target and one or more first parameters relating to at least one characteristic of a wireless signal received by a plurality of receivers, wherein the wireless signal was emitted by the target, the one or more first parameters being indicative of a location of the target at a time the signal was transmitted, the first parameters including localization parameters relating to an intensity or angle of arrival of the wireless signal or relating to a time difference of arrival between wireless signals at two different receivers which are included in the plurality of receivers, the one or more second parameters being derived from the emitted wireless signal, the velocity being derived using a frequency transformed from a segment of a combined time-domain signal composed of amplitudes of one or more wireless signals including the received wireless signal, the one or more wireless signals being received by the plurality of receivers, the first neural network is configured to infer a set of candidate locations of the target from the one or more first parameters relating to the at least one characteristic of the wireless signal; and the second neural network is configured to infer a location of the target from the one or more second parameters relating to the velocity of the target and the inferred set of candidate locations of the target.

15. The system according to claim 14, wherein the first neural network is trained using a plurality of first training examples each including determined values of the one or more first parameters derived from a signal emitted by the target at a predetermined location, and a set of candidate locations derived from the predetermined location as an output.

16. The system according to claim 15, wherein the set of candidate locations of each first training example is derived from the predetermined location by adding noise to the predetermined location.

17. The system according to claim 14, wherein the second neural network is trained using a plurality of second training examples including determined values of the one or more second parameters relating to the velocity of the target derived from a signal emitted by the target at a predetermined location and the set of candidate locations of the target.

18. The system according to claim 17, wherein the set of candidate locations of the target included in each second training example is an output of the trained first neural network inferred from the one or more first parameters derived from the signal emitted by the target at the predetermined location.

19. The system according to claim 14, wherein the one or more second parameters relating to the velocity of the target derived from the wireless signal from the target are parameters relating to a Doppler velocity derived from one or more wireless signals including the wireless signal, the one or more wireless signals being emitted within a predetermined period.

20. The system according to claim 19, wherein the parameters relating to the Doppler velocity are derived using a short term Fourier transform of a segment of a combined time-domain signal composed of amplitudes of the one or more wireless signals.

* * * * *